(12) United States Patent
Larson (10) Patent No.: US 9,056,438 B2
(45) Date of Patent: Jun. 16, 2015

(54) CURABLE COMPOSITION, ARTICLES COMPRISING THE CURABLE COMPOSITION, AND METHOD OF MAKING THE SAME

(75) Inventor: Eric G. Larson, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 536 days.

(21) Appl. No.: 13/461,957

(22) Filed: May 2, 2012

(65) Prior Publication Data

US 2013/0295311 A1 Nov. 7, 2013

(51) Int. Cl.

| | | |
|---|---|---|
| C08L 63/10 | (2006.01) |
| B32B 7/12 | (2006.01) |
| B32B 37/12 | (2006.01) |
| B32B 27/38 | (2006.01) |
| C08K 3/08 | (2006.01) |
| C09J 7/02 | (2006.01) |
| C08G 59/42 | (2006.01) |
| C08L 33/06 | (2006.01) |
| C08L 63/00 | (2006.01) |

(52) U.S. Cl.
CPC .................. *B32B 7/12* (2013.01); *Y10T 156/10* (2015.01); *Y10T 428/2848* (2015.01); *Y10T 428/14* (2015.01); *B32B 27/38* (2013.01); *C08K 3/08* (2013.01); *C08G 59/4284* (2013.01); *C08L 33/068* (2013.01); *C08L 63/00* (2013.01); *C08K 2003/085* (2013.01)

(58) Field of Classification Search
USPC ........................... 525/533; 523/458, 460, 461
See application file for complete search history.

(56) References Cited

U.S. PATENT DOCUMENTS

| | | |
|---|---|---|
| 3,753,968 A | 8/1973 | Ward |
| 4,069,202 A | 1/1978 | Carey |
| 4,296,231 A | 10/1981 | Gutekunst et al. |
| 4,769,399 A | 9/1988 | Schenz |
| 4,965,127 A | 10/1990 | Ebe et al. |
| 5,376,403 A | 12/1994 | Capote et al. |

(Continued)

FOREIGN PATENT DOCUMENTS

| | | |
|---|---|---|
| EP | 1 231 248 | 8/2002 |
| WO | WO 97/43352 A1 | 11/1997 |
| WO | WO 2009/035958 A2 | 3/2009 |

OTHER PUBLICATIONS

"Diacid 1525 dicarboxylic acid, Product Data Bulletin", 2002, 1 page, MeadWestvaco Corporation, Charleston, South Carolina.

(Continued)

*Primary Examiner* — Vu A Nguyen
(74) *Attorney, Agent, or Firm* — Bradford B. Wright

(57) ABSTRACT

A curable composition includes polyepoxide, high-melting metal particles having a melting point above 300° C., low-melting metallic particles having a melting point of less than or equal to 300° C., and a fluxing curing agent comprising a fluxing curing agent comprising: a hydroxyalkyl-substituted tertiary amine, and at least one diacid compound represented by the formula:

$$HO_2C—Z^1—CH_2CH_2CH_2—Z^2—CO_2H$$

wherein $Z^1$ and $Z^2$ independently represent a covalent bond or an aliphatic hydrocarbylene group. The at least one diacid compound comprises at least 50 percent of the total weight of carboxylic acids and anhydrides present in the curable composition. Articles comprising the curable composition, and methods of making the same are also disclosed.

21 Claims, 1 Drawing Sheet

(56) References Cited

U.S. PATENT DOCUMENTS

| | | |
|---|---|---|
| 5,538,789 A | 7/1996 | Capote et al. |
| 5,565,267 A | 10/1996 | Capote et al. |
| 5,604,026 A | 2/1997 | King |
| 5,716,663 A | 2/1998 | Capote et al. |
| 5,814,180 A | 9/1998 | King |
| 5,830,389 A | 11/1998 | Capote et al. |
| 5,853,622 A | 12/1998 | Gallagher et al. |
| 5,922,397 A | 7/1999 | Brandt et al. |
| 5,948,533 A | 9/1999 | Gallagher et al. |
| 5,980,785 A | 11/1999 | Xi et al. |
| 6,085,415 A | 7/2000 | Gandhi et al. |
| 6,127,619 A | 10/2000 | Xi et al. |
| 6,716,036 B2 | 4/2004 | Gandhi |
| 6,759,121 B2 | 7/2004 | Alahapperuma et al. |
| 7,858,499 B2 | 12/2010 | Plaut et al. |
| 7,888,411 B2 * | 2/2011 | Wrosch et al. ............... 523/459 |
| 8,008,783 B2 | 8/2011 | Plaut et al. |
| 8,022,145 B2 | 9/2011 | Larson et al. |
| 2003/0216061 A1 | 11/2003 | Gandhi |
| 2008/0142966 A1 | 6/2008 | Hirano et al. |
| 2008/0207814 A1 | 8/2008 | Wrosch et al. |
| 2009/0155597 A1 | 6/2009 | Kropp et al. |
| 2010/0227981 A1 | 9/2010 | Chiba et al. |
| 2011/0132537 A1 | 6/2011 | Choi et al. |

OTHER PUBLICATIONS

"Material Safety Datasheet, MeadWestvaco Diacid 1525", Feb. 22, 2006, 6 pages, MeadWestvaco Corporation, Charleston, South Carolina.

International Search Report, PCT/US2013/035410, mailed Jun. 25, 2013, 4 pages.

\* cited by examiner

CURABLE COMPOSITION, ARTICLES COMPRISING THE CURABLE COMPOSITION, AND METHOD OF MAKING THE SAME

FIELD

The present disclosure broadly relates to curable compositions and articles including them.

BACKGROUND

Wafers of semiconductor material such as silicon and gallium-arsenide with integrated circuits formed thereon have a relatively large diameter. In the production of integrated circuits (IC), such a wafer is adhered to a pressure-sensitive adhesive tape, sometimes called a dicing tape, and diced into IC chips. The IC chips (dice) are then removed from the dicing tape, and an adhesive (sometimes called a die attach adhesive) is applied to the chip or to a substrate, the chip is placed on the substrate and the adhesive is cured to attach the die to the substrate. Die attach adhesives, when cured, may be electrically and thermally conductive for some applications. The die attach adhesive may be applied to the surface of a chip that is opposite the circuits or it may be applied directly to the substrate to which the chip will be bonded. After bonding to the substrate with the die attach adhesive, the resultant assembly may be subjected to elevated temperature, for example, as may occur if subjected to a solder reflow step during assembly of an electronic device.

SUMMARY

In one aspect, the present disclosure provides a curable composition comprising:
at least one polyepoxide;
high-melting metal particles having a melting point above 300° C.;
low-melting metallic particles having a melting point of less than or equal to 300° C.;
a fluxing curing agent comprising:
a hydroxyalkyl-substituted tertiary amine; and
at least one diacid compound represented by the formula:

wherein $Z^1$ and $Z^2$ independently represent a covalent bond or an aliphatic hydrocarbylene group, and
wherein the at least one diacid compound comprises at least 50 percent of the total weight of carboxylic acids and anhydrides present in the curable composition.

In another aspect, the present disclosure provides an adhesive article comprising a layer of curable composition according to the present disclosure disposed on a removable liner.

In yet another aspect, the present disclosure provides a composite article comprising:
a semiconductor active device; and
a layer of a curable composition according to the present disclosure affixed to the semiconductor active device.

In yet another aspect, the present disclosure provides a method of making a composite article, the method comprising affixing a layer of a curable composition according to the present disclosure to a semiconductor wafer.

Advantageously, adhesive compositions according to the present disclosure may be suitable for use as die attach adhesives that can be formed into a dimensionally-stable film (e.g., a sheet or tape). When at least partially cured by thermal energy such adhesive compositions undergo transient liquid phase sintering producing a thermally and electrically conductive adhesive composition that securely bonds the semiconductor die to a substrate (e.g., a printed circuit board or a flex circuit).

As used herein:
a term such as "$C_q$" used in reference to an organic group or molecule, where q is a number, means that the group or molecule has q carbon atoms;
the term "electrically conductive" means having a surface resistance of less than $10^{-2}$ ohms per square;
the term "hydrocarbylene" refers to a divalent radical formed by removing two hydrogen atoms from a hydrocarbon;
the term "(meth)acryl" refers to acryl and/or methacryl; and
the term "polyepoxide" refers to a compound having more than one oxiranyl group (i.e., a three-membered ring formed by two carbon atoms and one oxygen atom that are connected to one another by single covalent bonds), also called an epoxy group.

In some embodiments, electrically conductive compositions and/or articles according to the present disclosure have a bulk resistance of less than 10, 1, 0.1, 0.01, or even less than $10^{-3}$ ohms per centimeter.

The features and advantages of the present disclosure will be further understood upon consideration of the detailed description as well as the appended claims.

In all cases, the disclosure is presented by way of representation and not limitation. It should be understood that numerous other modifications and embodiments can be devised by those skilled in the art, which fall within the scope and spirit of the principles of the disclosure.

DETAILED DESCRIPTION

Curable compositions according to the present disclosure comprise: a) at least one polyepoxide; b) high-melting metal particles having a melting point above 300° C.; c) low-melting metallic particles having a melting point of less than or equal to 300° C.; and d) a fluxing curing agent comprising: a hydroxyalkyl-substituted tertiary amine; and at least one diacid compound represented by the formula:

wherein $Z^1$ and $Z^2$ independently represent a covalent bond or an aliphatic hydrocarbylene group, and wherein the at least one diacid compound comprises at least 50 percent of the total weight of carboxylic acids and anhydrides present in the curable composition.

The at least one polyepoxide may comprise one or more liquid and/or solid polyepoxides, however the amount of any liquid components in the curable composition is desirably kept at a sufficiently low level that the curable composition is capable of forming a dimensionally stable film that will not flow appreciably on storage and handling at ambient temperatures (e.g., at 25 degrees Celsius (° C.)). For example the curable composition may comprise less than 50, 40, 30, 20, 10, 5, 1, or even less than 0.1 percent of liquid components such as polyepoxides.

Examples of useful epoxy resins include solid epoxy resins formed by reaction of bisphenol A or bisphenol F with epichlorohydrin, and mixtures of such resins. Examples of bisphenol A-epichlorohydrin derived epoxy resins (e.g., bisphenol A diglycidyl ether, DGEBA, m.p.=41.9-42.4° C.) and bisphenol F diglycidyl ether (m.p.=242° C.) and commercially available solid epoxy resins having the trade designation "EPON" (e.g., EPON 1001F, EPON 1002F, EPON 1004F, EPON 1007F, EPON 1009F, EPON 2003, EPON 2002, EPON 2003, EPON 2004, EPON 2005, EPON 2014, EPON 2024, and EPON 2041) marketed by Momentive Specialty Chemicals, Columbus, Ohio.

Useful epoxy resins also include polymeric polyepoxides such as, for example, linear polymers having terminal epoxy groups (e.g., a diglycidyl ether of a polyoxyalkylene glycol), polymers having skeletal epoxy groups (e.g., polybutadiene polyepoxide), and polymers having pendant epoxy groups (e.g., a glycidyl methacrylate polymer or copolymer). Polymeric polyepoxides may be pure compounds, but are generally mixtures or compounds containing one, two or more epoxy groups per molecule.

Epoxy resins that are both solid at ambient temperature and polymeric polyepoxides include, for example, commercially available solid epoxy resins having the trade designation "EHPE" (e.g., EHPE 3150 and EHPE 3180 cycloliphatic epoxy resins) available from Daicel Chemical Industries, Ltd., Tokyo, Japan. Useful polymeric polyepoxides may also comprise an acrylic polymer having pendant epoxy groups such as, for example, copolymers of glycidyl acrylate and an acrylic monomer (e.g., a copolymer of glycidyl(meth)acrylate with butyl acrylate). In some embodiments, the at least one polyepoxide comprises a solid non-polymeric polyepoxide and a polymeric polyepoxide.

Useful high-melting metal particles have a melting point above 300° C. and include, for example, copper particles, silver particles, gold particles, palladium particles, platinum particles, nickel particles, cobalt particles, chromium particles, cobalt particles, aluminum particles, lead particles, zinc particles, iridium particles, osmium particles, rhodium particles, tungsten particles, molybdenum particles, ferrous particles (e.g., stainless steel particles), and indium tin oxide particles. These metals may be used alone or in an alloy of two or more kinds thereof, as long as the alloy has a melting point above 300° C.

The high-melting metal particles may be generally spherical, flaky, or amorphous, or may have another shape. The high-melting metal particles may have any size, although desirably they have an average particle diameter ($D_{50}$) of from 0.1 to 10 microns, desirably from 0.2 to 7 microns, more desirably from 0.5 to 5 microns, and still more desirably from 1 to 3 microns.

The low melting point metallic particles are metallic particles that melt at or below 300° C., for example, less than about 275° C., or even less than about 225° C. The low-melting metallic particles are typically alloys although this is not a requirement. In some embodiments, the low-melting metallic particles comprise at least one of tin, lead, indium, or bismuth. Examples include metallic particles comprising solder alloys such as $Sn_{42}Bi_{58}$ (melting point (m.p.)=138° C.), $Sn_{43}Pb_{43}Bi_{14}$ (m.p.=163° C.), $Sn_{62}Pb_{36}Ag_{2}$ (m.p.=179° C.), $Sn_{63}Pb_{37}$ (m.p.=183° C.), $Sn_{60}Pb_{40}$ (m.p.=191° C.), $Sn_{95.5}Ag_{4}Cu_{0.5}$ (m.p.=217° C.), $Sn_{99.3}Cu_{0.7}$ (m.p.=227° C.), $Sn_{95}Ag_{5}$ (m.p.=245° C.), $Sn_{10}Pb_{88}Ag_{2}$ (m.p.=290° C.), $In_{90}Ag_{10}$ (m.p.=143° C.), $In_{60}Pb_{40}$ (m.p.=173-4° C.). Mixtures and alloys of the low melting point metallic particles may also be used.

In some embodiments, the weight ratio of the low melting point metallic particles and the high-melting metal particles is in a range of from 0.5 to 0.8, although other ratios may be used.

In some embodiments, during heating of the curable composition the low melting point metallic particles melts and/or sinters with the high melting metal particles thereby creating a conductive network. If the sintering temperature is sufficiently lower that the curing temperature of the curable composition, the composition will typically remain curable.

Conventional fluxing agents typically comprise acids (e.g., mineral acids and/or carboxylic acids) and acidic precursors (e.g., anhydrides) that can generate acids by hydrolysis or alcoholysis.

Fluxing curing agents in the present disclosure comprise a hydroxyalkyl-substituted tertiary amine and a diacid component. Without wishing to be bound by theory, the inventor believes that the hydroxyalkyl-substituted tertiary amine enhances fluxing of the high melting metal particles, at least when used in combination with a diacid of the fluxing curing agent.

In addition to fluxing, the fluxing curing agent also facilitates curing of the polyepoxide component(s) of the curable composition. Accordingly, it is desirably present in an amount that is effective to accelerate at least partial cure (e.g., substantially cure or completely cure) the at least one polyepoxide (e.g., at a temperature of at least 170° C., 200° C., or even at least 225° C.), although this is not a requirement.

The curable composition may further comprise one or more additional curatives (e.g., amines, thiols, anhydrides) for polyepoxides.

In some embodiments, the hydroxyalkyl-substituted tertiary amine comprises from at least 0.1 to 10 percent, desirably 0.1 to 5 percent, and more desirably, from 0.5 to 3 percent by weight of the curable composition.

In some embodiments, the hydroxyalkyl-substituted tertiary amine comprises a compound represented by the formula:

wherein $R^3$ represents a $C_2$-$C_4$ hydroxyalkyl group, and $R^4$ and $R^5$ independently represent a $C_2$-$C_{18}$ alkyl group or a $C_2$-$C_4$ hydroxyalkyl group. Examples include (2-hydroxyethyl)-diethylamine, 2-hydroxypropylisopropylmethylamine, (4-hydroxybutyl)dimethylamine, bis(2-hydroxyethyl)ethylamine, stearyldiethanolamine, and triethanolamine. Combinations of more than one hydroxyalkyl-substituted tertiary amine may also be used.

Fluxing curing agents according to the present disclosure also comprise at least one diacid compound represented by the formula:

wherein $Z^1$ and $Z^2$ independently represent a covalent bond or an aliphatic hydrocarbylene group. Examples of suitable such compounds include Diels-Alder adducts of conjugated linoleic acids (e.g., conjugated 9,11-linoleic acid or conjugated 8,10-linoleic acid) and (meth)acrylic acid; linear aliphatic diacids having at least 5 carbon atoms (e.g., 1,12-dodecanedioic acid; 1,10-decanedioic acid; 1,8-octanedioic acid; 1,6-hexananedioic acid; 1,4-butanedioic acid); and Dimer acids. Dimer acids are dicarboxylic acids prepared by dimerizing (e.g., by Diels-Alder condensation) unsaturated fatty acids (e.g., conjugated linoleic acids) obtained from tall oil.

In some embodiments, $Z^1$ and $Z^2$ independently represent aliphatic hydrocarbylene groups having from 1 to 30 carbon atoms. In some embodiments, $Z^1$ and $Z^2$ independently represent aliphatic hydrocarbylene groups having from 1 to 18 carbon atoms. In some embodiments, $Z^1$ and $Z^2$ independently represent aliphatic hydrocarbylene groups having from 1 to 12 carbon atoms. In some embodiments, $Z^1$ and $Z^2$ independently represent a covalent bond or a linear alkylene group having from 1 to 4 carbon atoms. In some embodiments, the fluxing curing agent comprises a Diels-Alder adducts of conjugated 9,11-linoleic and acrylic acid represented by the formula:

wherein one of $R^1$ and $R^2$ represents H, and one of $R^1$ and $R^2$ represents $CO_2H$ (hereinafter referred to as $C_{21}$ Fluxing Agent). One exemplary such compound is 5(or 6)-carboxy-4-hexylcyclohex-2-ene-1-octanoic acid (hereinafter $C_{21}$ Diacid), which has the Chemical Abstracts Service (CAS) Number 53980-88-4, which is available from chemical suppliers, or, for example, by Diels-Alder condensation of a conjugated 9,11-linoleic acid (i.e., CAS No.: 121250-47-3, $CH_3(CH_2)_5CH=CH-CH=CH(CH_2)_7CO_2H$), which is available from chemical suppliers. In some embodiments, $C_{21}$ Diacid is combined with one or more tall oil fatty acids, which may comprise at least one tall oil fatty acid (e.g., at least one $C_{18}$ mono-unsaturated tall oil fatty acid). A mixture of $C_{21}$ Diacid (55%) and tall oil fatty acids (45%) is available as DIACID 1525 from MeadWestvaco, Richmond, Va.

In order to achieve a reasonable level of fluxing action, the at least one diacid compound according to the formula:

$$HO_2C-Z^1CH_2CH_2CH_2-Z^2-CO_2H$$

may comprise at least 50, 55, 60, 65, 70, 75, 80, 85, 90, 95, or even at least 99 percent of the total weight of carboxylic acids and anhydrides present in the curable composition.

Additional conventional fluxing agents such as strong or weak acids may also be included, however they may not be desirable if they negatively interfere with the fluxing action of $C_{21}$ Fluxing Agent. For example, in some embodiments, the fluxing curing agent comprises at least 50 percent, 60 percent, 70 percent, 80 percent, 90 percent, 95 percent, or even at least 99 percent by weight of $C_{21}$ Fluxing Agent. In some embodiments, the fluxing curing agent comprises at least 50 percent, 60 percent, 70 percent, 80 percent, 90 percent, 95 percent, or even at least 99 percent by weight of a mixture of $C_{21}$ Fluxing curing agent and at least one tall oil fatty acid.

The curable composition may further comprise a polyol, desirably an aromatic polyol which copolymerizes with the polyepoxide to modify the physical properties of cured polyepoxide. Examples of suitable polyols include bisphenol A and bisphenol F. If present, the polyol may be used, for example, in an amount of from 30 to 150 percent by weight of the at least one polyepoxide.

The curable composition may further comprise additional ingredients such as, for example, dispersants, fillers, tougheners, antioxidants, plasticizers, stabilizers, and polymeric binder resins.

To facilitate manufacture and handling, the curable composition may include one or more organic solvents that have sufficient volatility that they are substantially removed by drying. Suitable organic solvents include, for example, ketones (e.g., acetone, methyl ethyl ketone), esters (e.g., butyl acetate, ethyl acetate), aromatic hydrocarbons (e.g., toluene), ethers (e.g., tetrahydrofuran, methyl t-butyl ether), and chlorinated hydrocarbons (e.g., dichloromethane, chloroform).

Weight percentages may be influenced substantially by the specific choice of metals included in the curable composition. In some embodiments, the curable composition comprises on a weight basis: 1 to 6 parts (in some embodiments, 2 to 5 parts) of the at least one polyepoxide (e.g., a pendant epoxy functional acrylic copolymer of butyl acrylate (50-70% by weight) and glycidyl methacrylate (30-50% by weight); 0.5 to 3 parts (in some embodiments, 1 to 2 parts) of the hydroxyalkyl-substituted tertiary amine (e.g., triethanolamine); 45 to 55 parts (in some embodiments, 47 to 53 parts) of high-melting metal particles having a melting point above 300° C. (e.g., copper particles); 35 to 45 (in some embodiments, 37 to 43 parts) parts of low-melting metallic particles having a melting point of less than or equal to 300° C.; and 0.1 to 5 parts (in some embodiments, 1 to 4 parts) of the at least one diacid compound (e.g., $C_{21}$ Diacid). In these embodiments, the curable composition may further comprise 2 to 5 parts (in some embodiments, 2 to 4 parts) of an aromatic polyol (e.g., bisphenol A).

The curable compositions, and especially the resulting cured composition after at least partial curing, are desirably electrically and/or thermally conductive, although these are not requirements.

Curable compositions may be prepared by any suitable method including, for example, by combining the components while mixing with optional mild heating. Curing can be achieved by heating, for example, to a temperature above 170° C., typically above 190° C. or even above 220° C.

Figure 1:
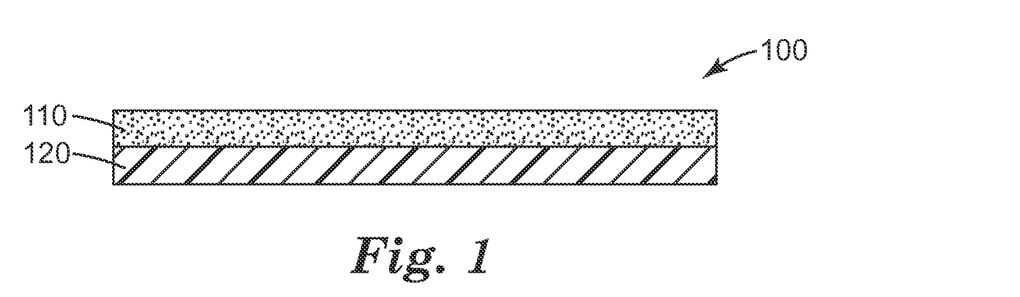
FIG. 1 is cross-sectional side view of an exemplary adhesive article according to the present disclosure.

Curable compositions according to the present disclosure are useful, for example, for preparing adhesive articles. An adhesive article comprising a curable composition according to the present disclosure is shown in FIG. 1, wherein adhesive article 100 comprises a layer 110 of curable composition according to the present disclosure disposed on removable liner 120.

Suitable removable liners include substrates that can be cleanly separated (e.g., by peeling) from the curable composition. Examples of removable liners include polyolefin films, siliconized (i.e., release coated) polyester films, and siliconized papers. Adhesive articles according to the present disclosure may, for example, be in roll form (e.g., a tape) or may comprise a sheet or stack of sheets. In some embodiments, the curable composition may be sandwiched between two removable liners.

Figure 2:
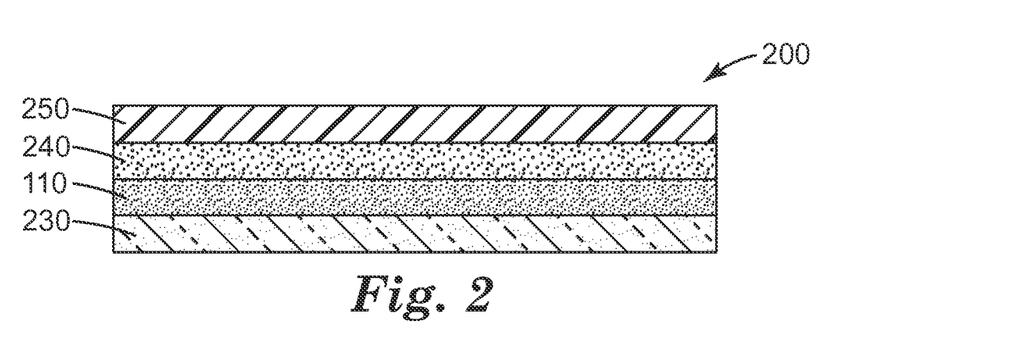
FIG. 2 is a cross-sectional side view of an exemplary composite article according to the present disclosure.

Curable compositions according to the present disclosure are useful, for example, for preparing composite articles. Referring now to FIG. 2, composite article 200 comprises a semiconductor wafer 230 (e.g., a silicon wafer, germanium wafer, gallium-arsenide wafer, gallium-phosphorus wafers, or gallium-arsenic-aluminum wafer) having layer 110 of curable composition according to the present disclosure affixed to it. As shown, layer 110 of curable composition is in contact with semiconductor wafer 230, although the presence of one or more optional intermediate layers is also contemplated. Optional layer 240 of detackifiable pressure-sensitive adhesive is disposed on the layer 110 of curable composition. Desirably, if layer 240 of detackifiable pressure-sensitive adhesive is present, then layer 110 of curable composition is partially cured to the B-stage (e.g., by heating) prior to disposing layer 240 thereon. Optional polymeric film backing 250 is disposed on layer 240 of detackifiable pressure-sensitive adhesive.

Suitable detackifiable pressure-sensitive adhesives are well-known and described, for example, in U.S. Pat. No. 4,965,127 (Ebe et al.) and U.S. Pat. No. 6,759,121 (Alahapperuma et al.).

Composite articles according to the present disclosure can be made by affixing (e.g., by laminating) a layer of a curable composition according to the present disclosure to a semiconductor active device, typically on a back side opposite the active surface comprising the electronic components. Similarly, in some embodiments, a layer of detackifiable pressure-sensitive adhesive disposed (e.g., by laminating) onto the layer of the curable composition. If the curable composition has the consistency of a paste or liquid it may be coated by syringe or screen printing, for example.

Curable compositions according to the present disclosure are useful, for example, for bonding active devices to a substrate by disposing the curable adhesive between the active device and the substrate and at least partially curing the curable composition. Examples of active devices include semiconductor dies and wafers have an active surface (e.g., with one or more electronic components formed thereon) and a back side opposite the active surface. Typically, the curable composition is applied to the back side although this is not a requirement. Examples of suitable substrates include heat-spreader, printed circuit boards, lead frames, interposers, and flex circuits.

SELECT EMBODIMENTS OF THE PRESENT DISCLOSURE

In a first embodiment, the present disclosure provides a curable composition comprising:

at least one polyepoxide;

high-melting metal particles having a melting point above 300° C.;

low-melting metallic particles having a melting point of less than or equal to 300° C.;

a fluxing curing agent comprising:

a hydroxyalkyl-substituted tertiary amine; and at least one diacid compound represented by the formula:

$$HO_2C-Z^1-CH_2CH_2CH_2-Z^2-CO_2H$$

wherein $Z^1$ and $Z^2$ independently represent a covalent bond or an aliphatic hydrocarbylene group, and wherein at least 50 percent of the total weight of carboxylic acids and anhydrides present in the curable composition.

In a second embodiment, the present disclosure provides a curable composition according to the first embodiment, wherein $Z^1$ and $Z^2$ independently represent aliphatic hydrocarbylene groups having from 1 to 18 carbon atoms.

In a third embodiment, the present disclosure provides a curable composition according to the first or second embodiment, wherein $Z^1$ and $Z^2$ independently represent a covalent bond or a linear alkylene group having from 1 to 4 carbon atoms.

In a fourth embodiment, the present disclosure provides a curable composition according to the first or second embodiment, wherein the at least one diacid compound comprises a Diels-Alder adduct of conjugated 9,11-linoleic and acrylic acid represented by the formula wherein one of $R^1$ and $R^2$ represents H, and one of $R^1$ and $R^2$ represents $CO_2H$.

In a fifth embodiment, the present disclosure provides a curable composition according to the first or second embodiment, wherein the compound is selected from the group consisting of: Diels-Alder adducts of conjugated 9,11-linoleic and acrylic acid; 1,12-dodecanedioic acid; 1,10-decanedioic acid; 1,8-octanedioic acid; 1,6-hexananedioic acid; 1,4-butanedioic acid; and dimer acids.

In a sixth embodiment, the present disclosure provides a curable composition according to any one of the first to fourth embodiments, wherein the fluxing curing agent further comprises at least one tall oil fatty acid.

In a seventh embodiment, the present disclosure provides a curable composition according to any one of the first to sixth embodiments, wherein the low-melting metallic particles comprise an alloy comprising at least one of tin, indium, or bismuth.

In an eighth embodiment, the present disclosure provides a curable composition according to any one of the first to seventh embodiments, wherein the high-melting metal particles comprise copper particles.

In a ninth embodiment, the present disclosure provides a curable composition according to any one of the first to eighth embodiments, wherein the at least one polyepoxide comprises a solid non-polymeric polyepoxide and a polymeric polyepoxide.

In a tenth embodiment, the present disclosure provides a curable composition according to the ninth embodiment, wherein the polymeric polyepoxide comprises an acrylic polymer having pendant epoxy groups.

In an eleventh embodiment, the present disclosure provides a curable composition according to any of the first to tenth embodiments, wherein the hydroxyalkyl-substituted tertiary amine comprises a compound represented by the formula:

$$NR^3R^4R^5$$

wherein $R^3$ represents a $C_2$-$C_4$ hydroxyalkyl group, and $R^4$ and $R^5$ independently represent a $C_1$-$C_{18}$ alkyl group or a $C_2$-$C_4$ hydroxyalkyl group.

In a twelfth embodiment, the present disclosure provides a curable composition according to the eleventh embodiment, wherein $R^3$, $R^4$, and $R^5$ represent 2-hydroxyethyl groups.

In a thirteenth embodiment, the present disclosure provides a curable composition according to any of the first to twelfth embodiments, wherein the curable composition comprises on a weight basis:

1 to 6 parts of the at least one polyepoxide;

45 to 55 parts of high-melting metal particles having a melting point above 300° C.;

35 to 45 parts of low-melting metallic particles having a melting point of less than or equal to 300° C.;

0.5 to 3 parts of the hydroxyalkyl-substituted tertiary amine; and 0.1 to 5 parts of the at least one diacid compound.

In a fourteenth embodiment, the present disclosure provides a curable composition according to any of the first to thirteenth embodiments, further comprising 2 to 5 parts of an aromatic polyol.

In a fifteenth embodiment, the present disclosure provides a curable composition according to any of the first to fourteenth embodiments, wherein if the curable composition is at least partially cured it becomes electrically conductive.

In a sixteenth embodiment, the present disclosure provides an adhesive article comprising a layer of the curable composition according to any one of the first to fifteenth embodiments disposed on a removable liner.

In a seventeenth embodiment, the present disclosure provides a composite article comprising:
a semiconductor active device.
a layer of a curable composition according to any one of the first to fifteenth embodiments affixed to the semiconductor active device.

In an eighteenth embodiment, the present disclosure provides a composite article according to the seventeenth embodiment, wherein the active device comprises a semiconductor wafer or a semiconductor die.

In a nineteenth embodiment, the present disclosure provides a composite article according to the eighteenth embodiment, further comprising a layer of detackifiable pressure-sensitive adhesive disposed on the layer of the curable composition.

In a twentieth embodiment, the present disclosure provides a method of making a composite article, the method comprising affixing a layer of a curable composition according to any one of the first to fifteenth embodiments to a semiconductor active device.

In a twenty-first embodiment, the present disclosure provides a method of making a composite article according to the twentieth embodiment, further comprising disposing a layer of detackifiable pressure-sensitive adhesive on the layer of the curable composition.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

The following abbreviations are used for materials in the Examples

TABLE OF ABBREVIATIONS

| Abbreviation | Description |
|---|---|
| OEO | a protected latent curing agent oligomer formed by the reaction of cyclohexene dicarboxylic anhydride and 1,2,3-trihydroxypropane prepared according to Example 1 of U.S. Pat. No. 5,376,403 (Capote et al.) |
| TEHA | triethanolamine |
| BisPA | bisphenol A |
| BA/GMA | acrylic copolymer of butyl acrylate (60% by weight) and glycidyl methacrylate (40% by weight) dissolved in acetone at 30% solids, having pendant epoxy groups, prepared according to Preparatory Example 1 of U.S. Pat. No. 7,858,499 (Plaut et al.) |
| Sn/Bi | 60% tin, 40% bismuth alloy particles, 10-micron average particle size |
| Cu | copper powder, 3-micron average particle size |
| DIACID 1525 | a mixture of 55% by weight $C_{21}$ Diacid and 45% $C_{18}$ fatty acids available as DIACID 1525 from Mead Westvaco, Richmond, Virginia |

TABLE OF ABBREVIATIONS -continued

| Abbreviation | Description |
|---|---|
| SPDA | N,N'-Disalicylal-1,2-propanediamine |
| EHPE 3150 | a solid multifunctional cycloliphatic glycidyl ether epoxy compound available as EHPE 3150 from Daicel Corp., Tokyo, Japan |
| HYPERMER KD1 | a polyester/polyamine condensation polymer hyperdispersant available as HYPERMER KD-1 from Croda, Inc., Edison, New Jersey |
| DEPT | N,N-diethyl p-toluidine |
| PRIPOL 1009 | Dilinoleic acid (CAS # 68783-41-5) available as PRIPOL 1009 from Croda Inc. |
| TDAMP | 2,4,6-tris(dimethylamino)phenol |
| S202 | 2 mole ethoxylate of stearyl amine available as VARONIC S 202 from Evonik Industries, Essen, Germany |

Examples 1-2 and Comparative Examples A-B

Compositions were prepared by mixing components according to the amounts in Table 1 (below).

TABLE 1

| | COMPOSITION, parts by weight | | | |
|---|---|---|---|---|
| COMPONENT | EXAMPLE 1 | EXAMPLE 2 | COMPARATIVE EXAMPLE A | COMPARATIVE EXAMPLE B |
| OEO | 0 | 0 | 0 | 0.27 |
| TEHA | 0.15 | 0.15 | 0.2 | 0.2 |
| BisPA | 0.3 | 0.3 | 0.3 | 0.3 |
| BA/GMA | 0.35 | 0.35 | 0.75 | 0.87 |
| Sn/Bi | 3.9 | 3.9 | 3.96 | 3.96 |
| Cu | 4.92 | 4.92 | 4.82 | 4.82 |
| SPDA | 0 | 0 | 0.27 | 0 |
| DIACID 1525 | 0.203 | 0.203 | 0 | 0 |
| EHPE 3150 | 0.11 | 0.11 | 0 | 0 |
| HYPERMER KD1 | 0 | 0.02 | 0 | 0 |

The compositions in Table 1 were coated using a notch bar knife onto a release coated PET polyester liner. The coated films were then oven dried at 60° C. for 7 minutes to give 50 micron thick coatings.

Sintering behavior of each dried film was tested by a heat/cool/reheat Differential Scanning calorimetry (DSC) test, using a scan rate 10° C./minute scan to 300° C., cool back to 40° C., then rescan to 300° C. Ideal sintering behavior is shown by a sharp endotherm at 140° C. (melting of the Sn/Bi alloy) on the initial scan, followed by broad exotherm from epoxy cure. Then on the reheat cycle there should be no endothermic or exothermic transitions until a sharp endotherm at 270° C. due to melting of pure Bi that remains after formation of a Cu/Sn intermetallic compound. Each composition of Examples 1 and 2 showed ideal sintering behavior by DSC initially after coating/drying. After 4 weeks of aging at room temperature, the Comparative Example B no longer showed ideal sintering behavior by DSC. There was no 270° C. endotherm in the re-scan, indicating there was no pure Bi present, and there were lower temperature broad endotherms present in the re-scan indicating incomplete sintering. Examples 1, 2 and Comparative Example A all showed ideal sintering behavior after 6 months of aging at room temperature.

Examples 1 and 2 were tested for dicing and die attach properties, and for electrical conductivity and thermal conductivity properties after curing. The general procedure for testing was lamination to a semiconductor wafer backside at 60° C. followed by thermal B-stage at 100° C. for 10 minutes. The liner was then removed and the B-staged adhesive was laminated to a UV de-tack dicing tape (available as ULTRON 1020R UV-sensitive tape (PVC), 95 μm thick, with backing film from MINITRON elektronik GmbH, Ingolstadt, Germany). Dicing was carried out using a dicing saw. The dicing tape was exposed to ultraviolet light (200 mJ/cm$^2$ dose) to detackify it, whereupon it was removed. Die pick and place and die bond to a glass microscope slide with the substrate heated to 120° C., bond time 0.5 sec. Thermal cure at 150° C. for 20 minutes followed by heating at 170-175° C. for 60 minutes. After die bonding and cure, die shear was >10 kilograms (kg) for a 4 mm×4 mm die. Yield after dicing was 100%. Electrical conductivity after cure was measured at 0.002 ohms/square, and thermal conductivity was 10 w/m-K (watts per meter-kelvin).

Examples 3-4 and Comparative Examples C-D

Compositions were prepared by mixing components according to the amounts in Table 2 (below).

TABLE 2

| | COMPOSITION parts by weight | | | |
|---|---|---|---|---|
| COMPONENT | COMPARATIVE EXAMPLE C | COMPARATIVE EXAMPLE D | EXAMPLE 3 | EXAMPLE 4 |
| Stearic acid | 0.156 | 0 | 0 | 0 |
| 1,10-Decanedioic acid | 0 | 0 | 0.156 | 0 |
| TEHA | 0.12 | 0.12 | 0.12 | 0.15 |
| BisPA | 0.23 | 0.23 | 0.23 | 0.3 |
| BA/GMA | 0.245 | 0.245 | 0.245 | 0.35 |
| Sn/Bi | 2.73 | 2.73 | 2.73 | 3.5 |
| Cu | 3.44 | 3.44 | 3.44 | 5.32 |
| Linoleic acid | 0 | 0.156 | 0 | 0 |
| PRIPOL 1009 | 0 | 0 | 0 | 0.22 |
| EHPE 3150 | 0.077 | 0.077 | 0.077 | 0.11 |
| HYPERMER KD1 | 0.014 | 0.014 | 0.014 | 0 |

The compositions of Comparative Examples C and D showed incomplete sintering performance in the DSC test used for Example 1, and the reheat cycle showed no endotherm at 270° C., which is indicative of a pure bismuth phase. Examples 3 and 4 showed ideal sintering behavior in the DSC test. In the reheat cycle to 300° C., the only transition was an endothermic melt of pure bismuth at 270° C. The lack of an observed exotherm in the reheat cycle also indicated that composition had been cured.

Examples 5-6 and Comparative Example E-F

Compositions were prepared by mixing components according to the amounts in Table 3 (below).

TABLE 3

| | COMPOSITION, parts by weight | | | |
|---|---|---|---|---|
| COMPONENT | EXAMPLE 5 | EXAMPLE 6 | COMPARATIVE EXAMPLE E | COMPARATIVE EXAMPLE F |
| DIACID 1525 | 0.203 | 0.203 | 0 | 0.103 |
| TEHA | 0.15 | 0.15 | 0.12 | 0.15 |
| BisPA | 0.3 | 0.3 | 0.23 | 0.3 |
| BA/GMA | 0.35 | 0.7 | 0.245 | 0.7 |
| Sn/Bi | 3.5 | 3.5 | 2.73 | 3.5 |
| Cu | 5.32 | 5.32 | 3.44 | 5.32 |

TABLE 3-continued

| | COMPOSITION, parts by weight | | | |
|---|---|---|---|---|
| COMPONENT | EXAMPLE 5 | EXAMPLE 6 | COMPARATIVE EXAMPLE E | COMPARATIVE EXAMPLE F |
| Nadic methyl anhydride | 0 | 0. | 0 | 0.1 |
| Dodecenyl-succinic anhydride | 0 | 0 | 0.156 | 0 |
| EHPE 3150 | 0.11 | 0 | 0.077 | 0 |
| HYPERMER KD1 | 0 | 0 | 0.014 | 0 |

The compositions of Comparative Examples E and F (both of which contain too little diacid) showed partial sintering performance in the DSC test used for Example 1, and the reheat cycle had a large endotherm at 200° C. and little to no endotherm at 270° C. indicating that no pure bismuth was formed. This suggests that anhydrides are not effective fluxing materials in the DSC test procedure. Compositions of Examples 5 and 6 showed excellent sintering in the DSC test, and the reheat cycle showed only a strong endotherm at 270° C. indicating presence of a pure bismuth phase with no other low melting metal phases present. The lack of an observed exotherm in the reheat cycle also indicated that the compositions had been cured.

Examples 7-8 and Comparative Example G-H

Compositions were prepared by mixing components according to the amounts in Table 4 (below).

TABLE 4

| | COMPOSITION, parts by weight | | | |
|---|---|---|---|---|
| COMPONENT | EXAMPLE 7 | EXAMPLE 8 | COMPARATIVE EXAMPLE G | COMPARATIVE EXAMPLE H |
| DIACID 1525 | 0.203 | 0.203 | 0.203 | 0.203 |
| S202 | 0.15 | 0.22 | 0 | 0 |
| BisPA | 0.3 | 0.3 | 0.3 | 0.3 |
| BA/GMA | 0.35 | 0.35 | 0.35 | 0.35 |
| Sn/Bi | 3.5 | 3.5 | 3.5 | 3.5 |
| Cu | 5.32 | 5.32 | 5.32 | 5.32 |
| TDMAP | 0 | 0 | 0.2 | 0 |
| DEPT | 0 | 0 | 0 | 0.15 |
| EHPE 3150 | 0.11 | 0.11 | 0.11 | 0.11 |

This series of examples compares the effectiveness of different types of tertiary amines as fluxing curing agents. Example 7 showed partial sintering by the DSC test used for Example 1, but Example 8 with an increased level of the ethoxylated amine S202 showed complete sintering of the metal powders. Comparative Examples G and H both used tertiary amines with no hydroxyl-alkyl substituents, and exhibited partial sintering in the DSC test used for Example 1 with no 270° C. endotherm present in the reheat cycle. The lack of an observed exotherm in the reheat cycle also indicated that the compositions had been cured.

All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A curable composition comprising:
   at least one polyepoxide;
   high-melting metal particles having a melting point above 300° C.;
   low-melting metallic particles having a melting point of less than or equal to 300° C.;
   a fluxing curing agent comprising:
      a hydroxyalkyl-substituted tertiary amine; and
      at least one diacid compound represented by the formula:

$$HO_2C-Z^1-CH_2CH_2CH_2-Z^2-CO_2H$$

wherein $Z^1$ and $Z^2$ independently represent a covalent bond or an aliphatic hydrocarbylene group, and
   wherein the at least one diacid compound comprises at least 50 percent of the total weight of carboxylic acids and anhydrides present in the curable composition.

2. A curable composition according to claim 1, wherein $Z^1$ and $Z^2$ independently represent aliphatic hydrocarbylene groups having from 1 to 18 carbon atoms.

3. A curable composition according to claim 1, wherein $Z^1$ and $Z^2$ independently represent a covalent bond or a linear alkylene group having from 1 to 4 carbon atoms.

4. A curable composition according to claim 1, wherein the at least one diacid compound comprises a Diels-Alder adduct of conjugated 9,11-linoleic and acrylic acid represented by the formula wherein one of $R^1$ and $R^2$ represents H, and one of $R^1$ and $R^2$ represents $CO_2H$.

5. A curable composition according to claim 1, wherein the diacid compound is selected from the group consisting of: Diels-Alder adducts of conjugated 9,11-linoleic and acrylic acid; 1,12-dodecanedioic acid; 1,10-decanedioic acid; 1,8-octanedioic acid; 1,6-hexananedioic acid; 1,4-butanedioic acid; and dimer acids.

6. A curable composition according to claim 1, wherein the fluxing curing agent further comprises at least one tall oil fatty acid.

7. A curable composition according to claim 1, wherein the low-melting metallic particles comprise an alloy comprising at least one of tin, indium, or bismuth.

8. A curable composition according to claim 1, wherein the high-melting metal particles comprise copper particles.

9. A curable composition according to claim 1, wherein the at least one polyepoxide comprises a solid non-polymeric polyepoxide and a polymeric polyepoxide.

10. A curable composition according to claim 9, wherein the polymeric polyepoxide comprises an acrylic polymer having pendant epoxy groups.

11. A curable composition according to claim 1, wherein the hydroxyalkyl-substituted tertiary amine comprises a compound represented by the formula:

$$NR^3R^4R^5$$

wherein $R^3$ represents $C_2$-$C_4$ hydroxyalkyl, and
    $R^4$ and $R^5$ independently represent a $C_1$-$C_{18}$ alkyl group or a $C_2$-$C_4$ hydroxyalkyl group.

12. A curable composition according to claim 11, wherein $R^3$, $R^4$, and $R^5$ represent 2-hydroxyethyl groups.

13. A curable composition according to claim 1, wherein the curable composition comprises on a weight basis:
    1 to 6 parts of the at least one polyepoxide;
    45 to 55 parts of high-melting metal particles having a melting point above 300° C.;
    35 to 45 parts of low-melting metallic particles having a melting point of less than or equal to 300° C.;
    0.5 to 3 parts of the hydroxyalkyl-substituted tertiary amine; and
    0.1 to 5 parts of the at least one diacid compound.

14. A curable composition according to claim 1, further comprising 2 to 5 parts of an aromatic polyol.

15. A curable composition according to claim 1, wherein if the curable composition is at least partially cured it becomes electrically conductive.

16. An adhesive article comprising a layer of the curable composition according to claim 1 disposed on a removable liner.

17. A composite article comprising:
    a semiconductor active device,
    a layer of a curable composition according to claim 1 affixed to the semiconductor active device.

18. A composite article according to claim 17, wherein the active device comprises a semiconductor wafer or a semiconductor die.

19. A composite article according to claim 18, further comprising a layer of detackifiable pressure-sensitive adhesive disposed on the layer of the curable composition.

20. A method of making a composite article, the method comprising affixing a layer of a curable composition according to claim 1 to a semiconductor active device.

21. A method of making a composite article claim 20, further comprising disposing a layer of detackifiable pressure-sensitive adhesive on the layer of the curable composition.

* * * * *

UNITED STATES PATENT AND TRADEMARK OFFICE
CERTIFICATE OF CORRECTION

PATENT NO. : 9,056,438 B2  
APPLICATION NO. : 13/461957  
DATED : June 16, 2015  
INVENTOR(S) : Eric Larson Page 1 of 1

It is certified that error appears in the above-identified patent and that said Letters Patent is hereby corrected as shown below:

Specification

Column 3
Line 26, Delete "cycloliphatic" and insert -- cycloaliphatic --, therefor.

Column 4
Line 61, Delete "6-hexananedioic" and insert -- 6-hexanedioic --, therefor.

Column 8
Line 15, Delete "6-hexananedioic" and insert -- 6-hexanedioic --, therefor.

Column 10
Line 5-10 (Approx.) (Table of Abbreviations), Delete "cycloliphatic" and insert -- cycloaliphatic --, therefor.

Claims

Column 13
Line 43, In Claim 5, delete "6-hexananedioic" and insert -- 6-hexanedioic --, therefor.

Column 14
Line 48, In Claim 21, delete "article" and insert -- article of --, therefor.

Signed and Sealed this  
Twenty-third Day of February, 2016

Michelle K. Lee  
*Director of the United States Patent and Trademark Office*